United States Patent [19]

Heyne et al.

[11] Patent Number: 4,672,248
[45] Date of Patent: Jun. 9, 1987

[54] HIGH SPEED BRUSHLESS DYNAMOELECTRIC MACHINE WITH IMPROVED CONTROL WHEEL ASSEMBLY FOR EXCITATION SYSTEM COMPONENTS

[75] Inventors: Carl J. Heyne, Hampton Township, Allegheny County; Donald T. Hackworth, Monroeville; Edward F. Docherty, N. Braddock; Edward J. Shestak, Penn Hills Township, Allegheny County, all of Pa.

[73] Assignee: Westinghouse Electric Corp., Pittsburgh, Pa.

[21] Appl. No.: 862,333

[22] Filed: May 12, 1986

[51] Int. Cl.$^4$ .................. H01C 3/04; H02K 19/38
[52] U.S. Cl. .................. 310/68 D; 310/72; 338/243
[58] Field of Search .......... 310/67 R, 68 D, 64, 310/60 R, 72; 338/238, 239, 243

[56] References Cited

U.S. PATENT DOCUMENTS

| | | | |
|---|---|---|---|
| 1,980,719 | 11/1934 | Egger | 338/243 |
| 2,898,571 | 8/1959 | Moule et al. | 338/238 |
| 3,629,627 | 12/1971 | Dafler | 310/68 D |
| 3,838,303 | 9/1974 | Ernst | 310/68 D |
| 3,845,369 | 10/1974 | Heyne | 318/174 |
| 3,872,335 | 3/1975 | Petersen et al. | 310/72 |
| 4,319,216 | 3/1982 | Ikeda et al. | 310/72 |
| 4,456,843 | 6/1984 | Heyne et al. | 310/68 D |
| 4,482,827 | 11/1984 | Baldwin | 310/68 D |

FOREIGN PATENT DOCUMENTS 240356  8/1962  Australia .................. 338/239

Primary Examiner—Patrick R. Salce
Assistant Examiner—D. L. Rebsch
Attorney, Agent, or Firm—G. H. Telfer

[57] ABSTRACT

A brushless dynamoelectric machine with a molded insulating control wheel having a rim on whose inner surface the rectifiers and other components of the starting control circuitry are directly mounted. Proximate the central hub of the control wheel is mounted a resistor wheel of metal having axial apertures in which are located cartridge heater-type resistors that are interconnected to provide the starting resistor of the control circuitry. The resistor wheel has external fins that aid in dissipating heat from the resistors and also blow air onto the components mounted on the wheel rim.

6 Claims, 6 Drawing Figures

HIGH SPEED BRUSHLESS DYNAMOELECTRIC MACHINE WITH IMPROVED CONTROL WHEEL ASSEMBLY FOR EXCITATION SYSTEM COMPONENTS

BACKGROUND AND SUMMARY OF THE INVENTION

This invention relates to brushless dynamoelectric machines and, more particularly, to such machines having rotatable control wheel assemblies for the excitation control circuit.

Reference is made to Heyne et al. U.S. Pat. No. 4,456,843, June 26, 1984, for background to the present invention. The patent describes a brushless dynamoelectric machine provided with a control wheel of molded insulating material. The wheel has a rim on the inner surface of which the rectifiers and other components of the starting control circuitry are directly mounted. In a specific embodiment of the patent, starting, or discharge, resistors are provided of wound wire on the outer surface of the control wheel rim with provision for their mechanical support and ventilation. During the further development of the molded control wheel assembly, improvements have been made which are now presented in this patent application.

The objectives sought are to reduce cost and weight and to provide an insulated control wheel on which the components are arranged with a high power density; that is, in a very compact unit. The design of the prior patent did so to a degree, but the arrangement of the present invention does so even more effectively and is particularly more suitable for machines with shaft speeds of 1800 rpm or more.

By the present invention, the molded insulating control wheel concept of the prior patent is retained, in that excitation control components are mounted on the inside of a rim portion of a structure of molded insulation material. However, instead of using a wire-wound resistor on the rim exterior, a centrally located resistor wheel is used. The resistor wheel is a metal cylinder located radially within the rim of the control wheel and proximate to the hub of the control wheel where it is secured. A major portion of the resistor wheel is of solid metal having a plurality of axially extending apertures, in each of which is located a resistance element, all of which are interconnected to form a field discharge resistor. The resistor elements are each preferably a cartridge heater of a resistance wire within a metal jacket and having a solid mass of thermally conductive, electrically insulative, material between the wire and the jacket. The mounting of the resistance elements is such that the metal jackets fit closely against the adjacent metal of the resistor wheel for a substantially direct heat transfer therebetween. It is therefore seen that among the key changes from the prior patented design to the presently preferred design are that the resistors are now centrally located rather than on the outside of the rim, the resistors are cartridge resistors instead of wire-wound resistors, and the resistors are enclosed in a substantially metallic structure for heat dissipation rather than relying on ventilation.

Additionally, the resistor wheel, in its location directly radially inside components mounted on the inner rim of the control wheel, is provided with longitudinally or axially extending fins or blades. The fins or blades help to dissipate heat from the resistors and also serve as fan blades directing air against the components on the control wheel rim for overall improvement in the power density of the arrangement.

The components on the inner surface of the wheel rim include finned heat sinks for the diode rectifiers and SCRs of the control circuit. For further improvement in heat transfer, the fins of the heat sinks are made to extend at an angle of up to about 45°, such as about 25°, to the direction of rotation.

The system as described above and more particularly described in the following description of preferred embodiments has made possible the provision of an integrated control wheel and starting resistor package which in contrast to formerly conventional designs such as that illustrated in FIG. 2 of the above-mentioned patent can yield a weight reduction of about 45-70% and an inertia reduction of about 75 to 90%. This will allow operation on high speed machines (at least 1800 rpm) with the control package mounted outside of the bearing adjacent the motor in an overhung arrangement with minimized shaft stresses caused by lateral and torsional excitation forces.

DESCRIPTION OF THE PREFERRED EMBODIMENTS

Figure 1:
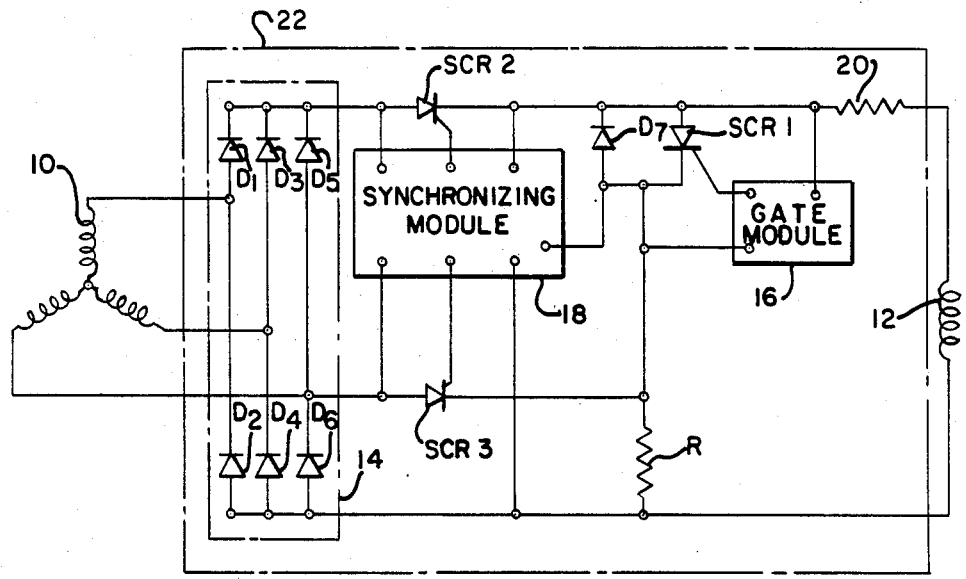
FIG. 1 is a circuit schematic of a brushless excitation system applicable to both the prior art and the present invention.

FIG. 1 shows a schematic of a basic circuit to which the present invention can be applied. An AC exciter armature winding 10 is connected to a DC field winding 12 of an AC synchronous motor through a diode rectifier bridge 14 including diodes D1 through D6 and a synchronizing circuit including thyristor devices identified as SCR1, SCR2, and SCR3. Additionally, the circuit includes starting resistor R, diode D7 in antiparallel relation with SCR1, a gate module 16 for control of the firing of SCR1 and a synchronizing module 18 for control of the firing of SCR2 and SCR3. The circuit also shows a metering shunt 20 between the synchronizing circuit and the field winding 12. The operation of the circuit is in accordance with prior practice. The principle object of the present invention is to provide a control wheel structure on which all of the components enclosed by the dot-dash line 22 may be mounted for rotation with the exciter armature winding 10 and the field winding 12.

Figure 2:
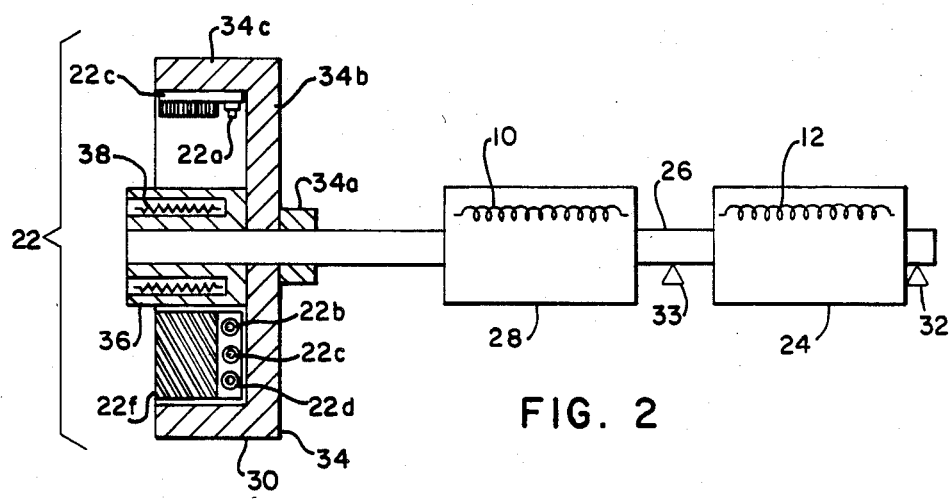
FIG. 2 is a side elevation view, partly in section, of a generalized, partly schematic, embodiment of the present invention.

Referring to FIG. 2, a generalized embodiment of the present invention is illustrated. A synchronous motor, or other dynamoelectric machine, has a rotor 24 carrying the field winding 12. The rotor 24 is on a shaft 26 that is common (or directly interconnected) with that of an exciter armature 28 carrying the exciter winding 10 and a control wheel assembly 30 on which the components 22 referred to in connection with FIG. 1 are mounted. Consistent with preferred forms of the present invention as well as that of the above-mentioned U.S. Pat. No. 4,456,843, the arrangement is of an overhung exciter, meaning that bearings 32 and 33 supporting the motor rotor 24 are the only bearings for the running of the shaft 26. The exciter armature 28 is outside bearing 33 and the control wheel 30 is even farther outside that bearing.

The control wheel assembly 30 is desirably light, compact, and reliable. For those purposes, the control wheel assembly 30 consists of a molded insulating wheel 34 having a hub portion 34a on or joined to the shaft 26, a plate portion 34b extending radially away from the shaft, and a rim portion 34c extending axially from the plate portion and spaced from the shaft. The interior surface of the rim 34c has a plurality of surface portions on which are mounted the various components 22 of the excitation circuit. Merely for general illustration representative components 22a through 22d are shown in FIG. 2 mounted on heat sinks 22e and 22f having fins extending toward the axis.

The molded wheel also has mounted to it proximate the hub portion 34a a metal, such as steel, cylinder 36 (sometimes referred to as a resistor wheel) within which are located resistor elements 38 comprising the starting or discharge resistor R of the circuit of FIG. 1. This is in contrast to the prior patent in which the resistor was of wire wound on the outside of the wheel rim. Now there is provided a more compact arrangement with a resistor package centrally located and preferably essentially embedded in metal for heat dissipation, rather than relying on air ventilation.

Figure 3:
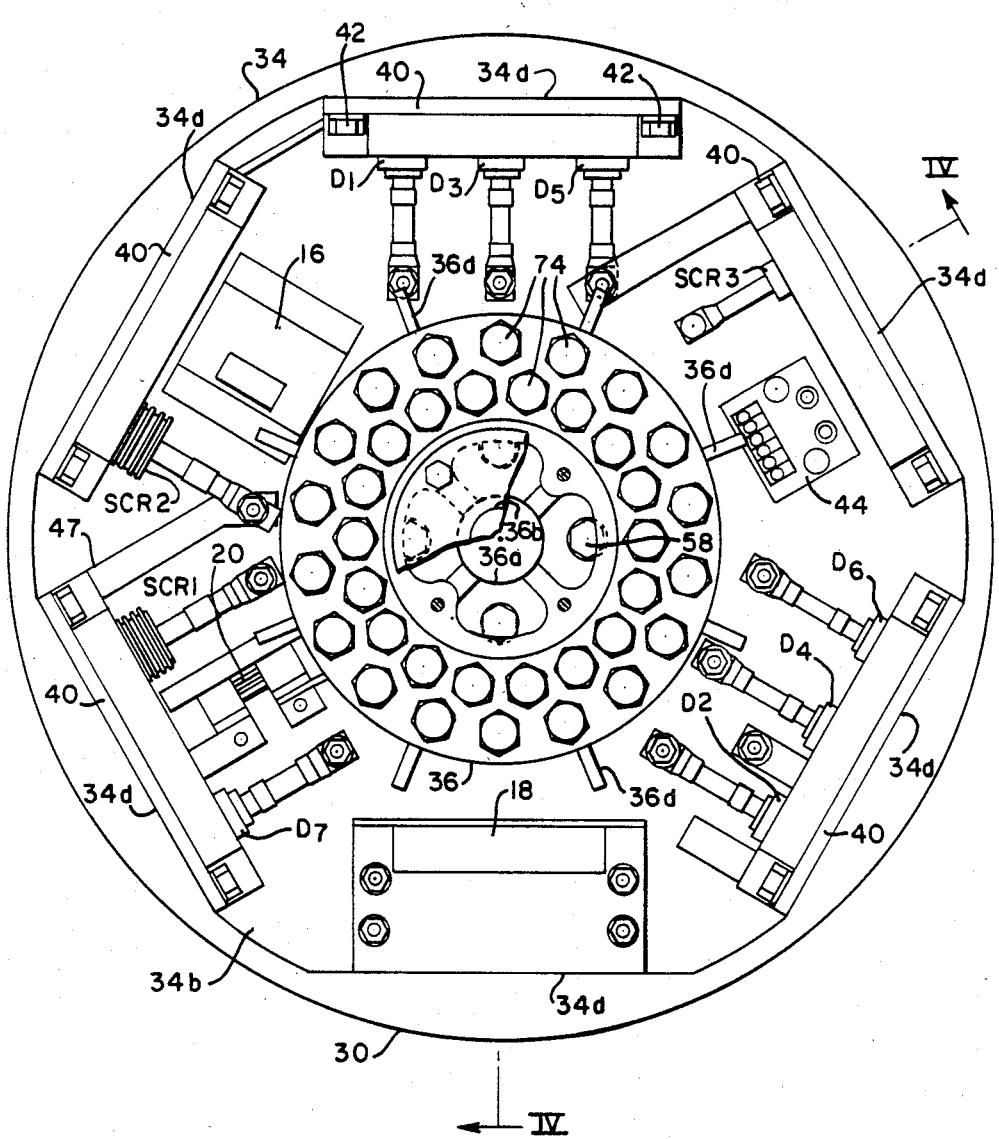
FIG. 3 is an elevation view into the inside of a control wheel assembly in accordance with the present invention.
Figure 4:
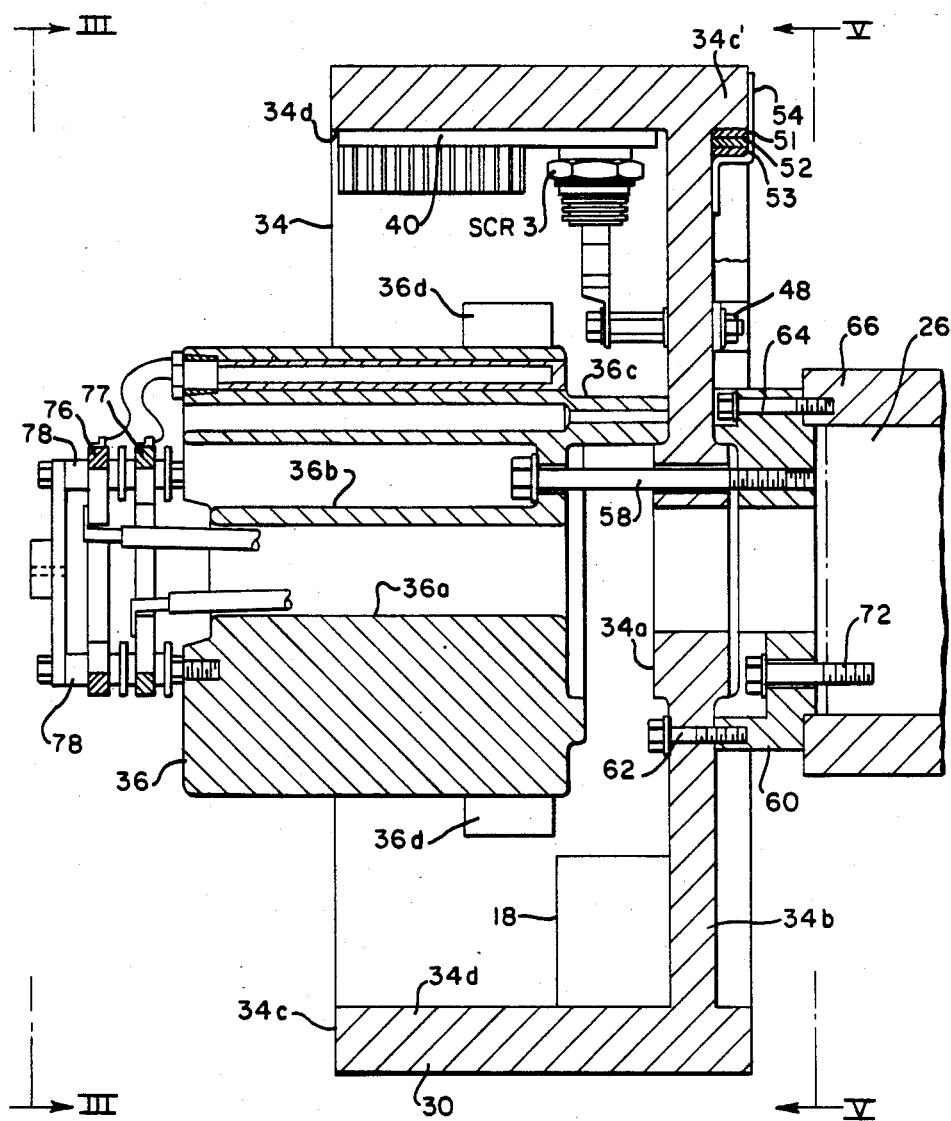
FIG. 4 is a partly sectioned axial view taken along the line IV—IV of FIG. 3.

Referring to FIG. 3, a view of a specific embodiment of a control wheel assembly 30 is shown taken as if from the left side of the arrangement shown in FIG. 2 and along the line III—III shown in FIG. 4.

FIG. 4 shows a sectional view of the assembly of FIG. 3 taken along the line IV—IV. However, it will be understood that for simplicity of illustration not all components are shown in the view of FIG. 4 but the relationship of key components can be understood from it. In addition, FIG. 5 shows the back side of the assembly 30 taken along the line V—V of FIG. 4.

Figure 5:
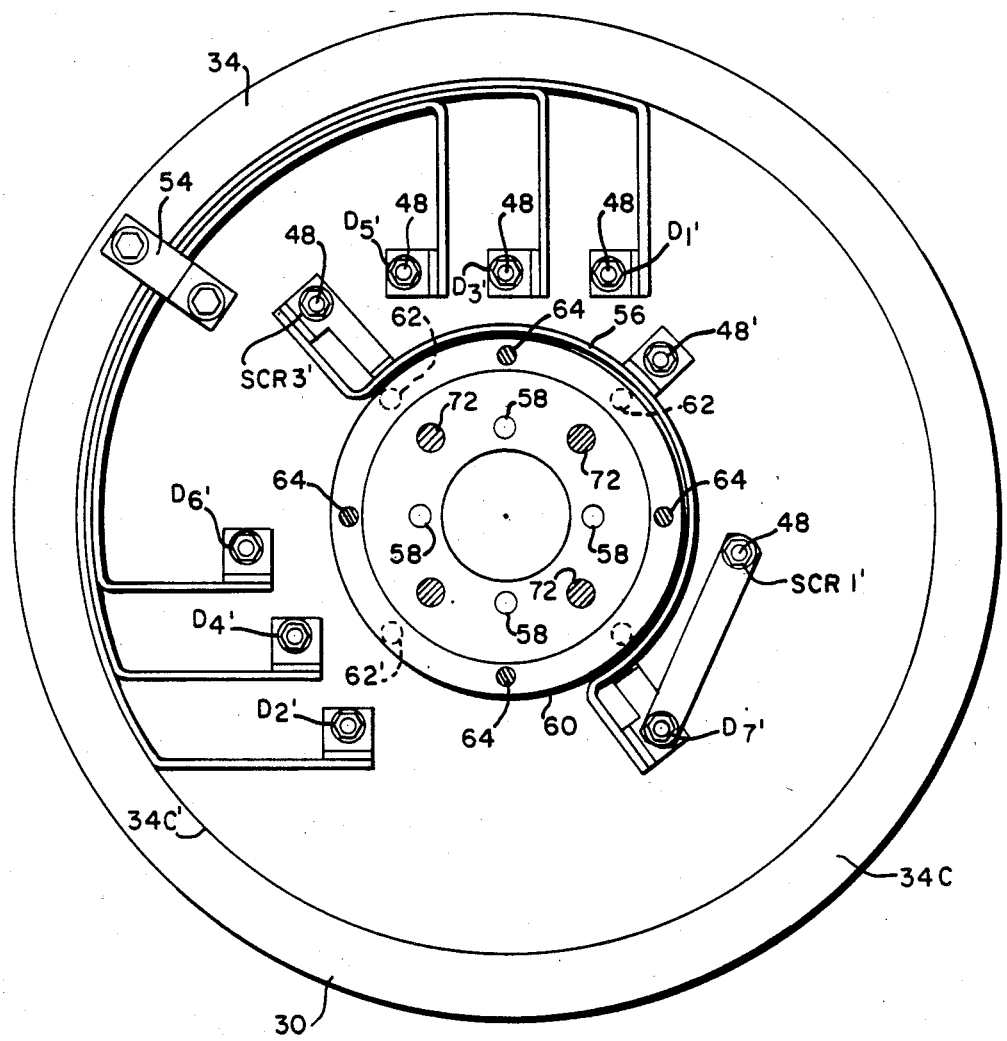
FIG. 5 is an axial view of a control wheel assembly taken from the side of the assembly adjacent the dynamoelectric machine to be controlled along line V—V of FIG. 4; and, FIG. 6 is a plan view of a heat sink component incorporated in an embodiment of the invention.

As in FIG. 2, the embodiment of FIGS. 3–5 includes a molded control wheel 34 with a hub portion 34a, a radial plate portion 34b, and an axially extending rim portion 34c which are all integrally formed of molded insulating material such as glass fiber reinforced polyester or epoxy resin.

The interior of the wheel rim 34c, as seen in FIG. 3, has a plurality of flat surfaces 34d, numbering six (6) in this example, to form a hexagonal configuration. On these flat surface portions 34d and also to some extent on the adjacent surfaces of the plate portion 34b of the wheel 34 are mounted substantially all of the components of the excitation circuit 22 of FIG. 1. At the 12o'clock location in FIG. 3 diodes D1, D3 and D5 which have electrically common cathodes are arranged together on a heat sink 40 secured to the wheel by fasteners 42. The securing of the diodes D1, D3 and D5 to the heat sink 40 is performed by having openings, not shown, in the wheel rim 34c for threaded stud and nut securement. Similarly, in the lower right quadrant of FIG. 3 are mounted the diodes D2, D4 and D6, which have common anodes, on another heat sink 40. SCR1 and diode D7 are mounted in a similar arrangement in the lower left quadrant, SCR2 in the upper left quadrant, and SCR3 in the upper right quadrant.

Near the location of SCR2 there is mounted on the inner surface of the plate portion 34b of the wheel the gate module 16 of the synchronizing circuit. Additionally, on the lowermost flat surface portion 34d and against plate portion 34b is mounted the synchronizing module 18, also shown in FIG. 4. An example of circuitry to be incorporated within the synchronizing module may be found by reference to copending application Ser. No. 833,300, filed Feb. 26, 1986 by G. T. Mallick et al., assigned to the present assignee.

A module of indicator lights 44 for visual inspection of the operation of the circuitry (e.g. to indicate when resistor R is turned off) is mounted on the surface of plate portion 34b in the upper right-hand quadrant and a shunt resistor 20 in the lower left-hand quadrant. Shunt resistor 20 is merely for test purposes and is small enough (producing about 50 mv. at rated field current) to avoid any significant efficiency less in machine operation.

Interconnections between the components may be variously formed. For example, a conductive strap 46, secured by fasteners 42 holding the uppermost and top left heat sinks 40, connects the cathodes of diodes D1, D3 and D5 with the anode of SCR2. Strap 47 connects the anode of SCR1 with the cathode of SCR2. FIG. 5 shows conductive fasteners 48 extending through the molded wheel plate 34b from devices shown in FIG. 3 joined with conductive straps that complete interconnections on the back side of the wheel 34. Mutually insulated conductive straps 50, 51 and 52 respectively interconnect diodes D1 and D2, D3 and D4, and D5 and D6. The straps extend out from the diode locations to the underside of a rim overhang portion 34c' where they extend circumferentially and are held by a holding strap 54. Phase leads (not shown) are attached to diode fasteners 48 in the upper portion of FIG. 5 and proceed to the exciter winding 10.

Also shown in FIG. 5 is a conductive strap 56 connecting the cathode of SCR3 to the anode of D7 and a terminal 48' of the gate module 16. For illustration purposes, in FIG. 5 the component terminals are referred to by the component identity primed, that is terminals D1', D3', and D5' communicate to the respectively identified diodes on the other side of the wheel plate 34b.

An embodiment of resistor wheel 36 is seen primarily in FIG. 4 and also from the end in FIG. 3. Wheel 36 has a bore 36a aligned with the axis of shaft 26. Near but spaced from the bore are recesses 36b for a first set of mounting fasteners 58. The wheel 36 also has a plurality of spacer bosses 36c that abut against control wheel plate 34b next to the hub 34a. The first set of fasteners 58 goes through the wall of the recess 36b, past the spacer bosses 36c, through the control wheel hub 34a and into an adapter plate 60. FIG. 5 shows the fastener arrangement.

The adapter plate 60 is also joined with the control wheel 34 by a second set of (for example, four) fasteners 62. A third set of fasteners 64 joins together the adapter plate 60 and a quill shaft 66. The quill shaft 66 has a cylindrical configuration and fits around the end of shaft 26. A fourth set of fasteners 72 joins the adapter plate directly to the shaft 26. The use of an adapter plate 60 and quill shaft 66, as shown, makes possible the use of a given control wheel assembly 30 with various different shaft end configurations. The fasteners 58, 62, 64 and 72 may each be a threaded bolt with a lock washer.

The resistor wheel has a plurality of axially running apertures, numbering 30 to 40 for example, in each of which is located a resistor 74. Each resistor 74 comprises a high resistance wire imbedded in a material for electrical insulation but substantial heat conduction such as magnesium oxide, all of which is enclosed within a metal cylinder. Such resistors, sometimes referred to as "cartridge heaters" are known and available under the trademark "Chromalox."

It is suitable if desired to provide a more open construction of the resistor wheel 36 such as by having radially extending holes for the dual purposes of reducing the weight and for providing ventilating air to portions of the resistor cartridges 74. However, it has been found generally more preferable to have a relatively solid resistor wheel adjacent resistors 74 so the metal cartridges of the resistors are in intimate contact with the metal of the wheel over substantially their entire surfaces. The cartridges are threadably engaged into the wheel for tight engagement. This ensures good heat transfer to the wheel. The mass of the wheel and its surface area make possible better heat dissipation and it has been found unnecessary to further reduce the weight of the structure. There can, however, be a system of both radial holes and circumferential grooves if desired to further reduce the weight of the wheel.

The wheel 36 is provided on its outer surface with fins 36d to help cool the resistor wheel itself and also to blow cooling air onto the heat sinks 40 of the control wheel.

Figure 6:
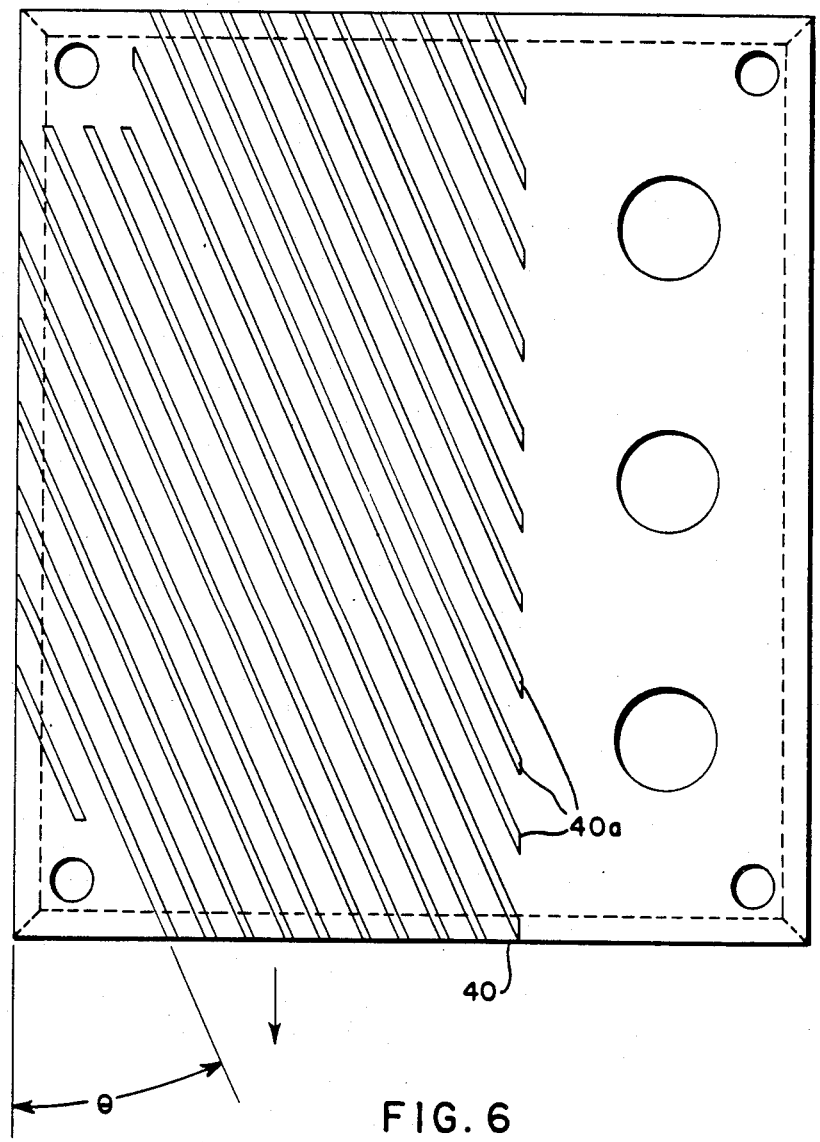

The resistor wheel 36 has been designed to nest substantially within the control wheel 30 to reduce the axial length of the combined assembly. This nesting arrangement allows the resistor wheel to act as a blower to force cooling air against the heat sinks on the control wheel. FIG. 6 shows a heat sink 40 which may be used, for example, to mount three of the diodes. The heat sink has fins 40a that run at an angle of up to about 10° to about 45° (25° in this example) to the direction of rotation (arrow) for improved heat transfer. This is particularly advantageous for machines designed for single direction rotation.

Leads 75 from the resistors 74 are routed radially inward and connected to two concentric copper connecting rings 76 and 77. The leads 75 and rings 76 and 77 place all the resistors 74 electrically in parallel. The rings are mounted on four equally spaced insulated studs 78. The insulated studs consist of a steel rod covered with a close-fitting insulating sleeve, which together pass through close-fitting holes in the rings and short insulating sleeves which keep the rings separated. The profile of the copper rings 76 and 77 and the spacing of the insulated studs 78 (seen in FIG. 3) provide access to the resistor assembly mounting bolts 58 without requiring heater disconnection. Leads 79 connecting the resistor assembly to the rest of the circuit are routed through the center bore hole 36 in the resistor assembly.

With respect to the mounting of the resistor wheel 36 and control wheel 34, it should be noted that the adapter plate 60 serves several purposes. First, it allows a single molded wheel 34 to be readily adaptable to a variety of motor shaft mountings. A quill shaft mounting 66 is shown but it should be clear that direct shaft mounting is easily accomplished with a modified adapter plate 60. The adapter plate 60 also serves as a puller for a quill-type design which allows the quill to be pulled from the motor shaft without subjecting the composite wheel to a high local compressive force during the pulling operation.

It is therefore seen that the nested control wheel resistor design has developed to minimize the weight and inertia of the control and resistor wheel. While retaining certain features of the molded control wheel of the prior patent, the resistor assembly is quite different and provides an inertia which is much smaller than can be obtained with a large diameter wire-wound coil resistor. The ability to achieve low inertia and reduced weight allows this system to be applied to higher speed, lower horsepower machines than could be accommodated with former designs.

One example of a control wheel assembly 30 in accordance with the invention has been made with the following size, weight and inertia:

|  | Control Wheel 34 | Resistor Wheel 36 | Total |
|---|---|---|---|
| Weight (lb.) | 112 | 116 | 228 |
| Volume (in.$^3$) | 3420 | 980 | 3700 |
| Inertia (lb.-in.$^2$) | 9100 | 1621 | 10721 |

The molded control wheel had an outside diameter of about 22 in. The resistor wheel was about 10 in. in outside diameter and extended about 7 in. extended axially beyond the axial extent of the control wheel rim. In contrast, the control wheel arrangement to be replaced comprised a separate control wheel and resistor wheel, each of metal and having respective diameters of about 26 in. and 33 in. and respective axial lengths of about 4.6 in. and 3.5 in. The size, weight and inertia were as follows:

|  | Former Control Wheel | Former Resistor Wheel | Total |
|---|---|---|---|
| Weight (lb.) | 230 | 200 | 430 |
| Volume (in.$^3$) | 2650 | 3000 | 5650 |
| Inertia (lb.-in.$^2$) | 19750 | 23700 | 43450 |

Consequently, it is seen that in this particular example implementation of the invention provides a weight reduction of about 47%, a volume reduction of about 35%, and an inertia reduc of about 75%.

We claim:

1. A dynamoelectric machine control assembly comprising:
   a rotatable shaft;
   a field winding located for rotation with said shaft;
   excitation control means for applying direct current excitation to said field winding and comprising a rectifier bridge, starting control circuitry and a field discharge resistor all mounted for rotation with said shaft on a control wheel, said control wheel comprising a hub, a rim portion, and a radially extending plate portion extending between and joining said hub and said rim portion within a unitary structure of molded insulation material;
   a plurality of elements of said rectifier bridge and said starting control circuitry arranged on an inner surface of said rim portion;
   a resistor wheel comprising a metal cylinder located proximate to said hub portion of said control wheel, said resistor wheel having a plurality of axially extending apertures in each of which is located a resistance element, each of said resistance elements being collectively interconnected to form a field discharge resistor;

said resistance elements of said field discharge resistor each being a cartridge heater of a resistance wire within a metal jacket and having a solid mass of thermally conductive, electrically insulative material between said wire and said jacket, said jacket fitting closely against adjacent material of said resistor wheel metal cylinder for substantial direct heat transfer therebetween.

2. A brushless dynamoelectric machine system comprising:

a main dynamoelectric machine having a rotor with a field winding;

an exciter having a rotor with an armature winding;

a control wheel assembly for receiving AC power from said armature winding and selectively supplying DC power to said field winding and comprising a control wheel having control circuitry mounted on interior surface portions of a rim portion of insulating material and a resistor wheel having resistance elements therein interconnected as a field discharge resistor; said resistor wheel comprising a metal cylinder located substantially within said rim portion of said control wheel;

shaft means for rotation in common of said main dynamoelectric machine rotor, said exciter rotor and said control wheel assembly;

bearing means adjacent said main dynamoelectric machine rotor on said shaft means;

said exciter rotor and said control wheel assembly being located on said shaft means outside said bearing means in an overhung arrangement supported only by said bearing means;

said resistance elements being metal sheathed cartridge heaters in close thermal relation to metal of said resistor wheel and said resistor wheel outer cylindrical surface having heat dissipation fins thereon that also aid in ventilating control circuitry on said control wheel rim.

3. A brushless dynamoelectric machine control assembly in accordance with claim 1 wherein:

said resistance elements have substantially the entire of said metal jackets fitting closely against adjacent material of said resistor wheel metal cylinder;

said resistor wheel metal cylinder has on its outer surface a number of fins inducing air flow against said plurality of elements arranged on said inner surface of said rim portion; said plurality of elements including finned heat sinks whose fins extend at an angle of up to about 45° to the direction of rotation for increased heat transfer.

4. A brushless dynamoelectric machine control assembly in accordance with claim 1 further comprising:

means for joining said resistor wheel and said control wheel to each other and to said shaft.

5. A brushless dynamoelectric machine control assembly in accordance with claim 4 wherein:

said means for joining comprises an adapter plate located between said control wheel and an end of said shaft and a quill shaft of cylindrical configuration extending around said end of said shaft;

a first set of fasteners joining said resistor wheel, said control wheel and said adapter plate;

a second set of fasteners joining said control wheel and said adapter plate;

a third set of fasteners joining said adapter plate and said quill shaft; and, a fourth set of fasteners joining said adapter plate and said end of said shaft.

6. A brushless dynamoelectric machine control assembly in accordance with claim 1 wherein:

said resistance elements are interconnected electrically in parallel at a pair of connecting rings mounted on insulated studs proximate the axial center of said resistor wheel.

* * * * *